(12) United States Patent
Chen et al.

(10) Patent No.: US 9,544,623 B2
(45) Date of Patent: Jan. 10, 2017

(54) QUOTA AWARE VIDEO ADAPTATION

(71) Applicants: Jiasi Chen, Princeton, NJ (US); Mung Chiang, Princeton, NJ (US); Amitabha Ghosh, Los Angeles, CA (US)

(72) Inventors: Jiasi Chen, Princeton, NJ (US); Mung Chiang, Princeton, NJ (US); Amitabha Ghosh, Los Angeles, CA (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 14/326,218

(22) Filed: Jul. 8, 2014

(65) Prior Publication Data

US 2015/0012928 A1 Jan. 8, 2015

Related U.S. Application Data

(60) Provisional application No. 61/843,537, filed on Jul. 8, 2013.

(51) Int. Cl.
  *H04H 60/32* (2008.01)
  *H04N 21/24* (2011.01)
  (Continued)

(52) U.S. Cl.
  CPC ........ *H04N 21/24* (2013.01); *H04N 21/23439* (2013.01); *H04N 21/25866* (2013.01);
  (Continued)

(58) Field of Classification Search
  CPC .... H04N 21/4516; H04N 21/24; H04N 7/162; H04N 21/2543; H04N 21/26225; H04L 12/14; H04L 21/141; H04L 12/1414; H04L 12/1417
  See application file for complete search history.

(56) References Cited

U.S. PATENT DOCUMENTS

| | | | | |
|---|---|---|---|---|
| 8,015,117 B1* | 9/2011 | Lillibridge | ........... | G06Q 20/382 705/64 |
| 2010/0278271 A1* | 11/2010 | MacInnis | ............. | H04N 19/172 375/240.18 |
| 2014/0044197 A1* | 2/2014 | Liao | ................. | H04N 21/23418 375/240.26 |

OTHER PUBLICATIONS

Chava et al., "Cost-Aware Mobile Web Browsing", IEEE Pervasive Computing, Mar. 2012.*

(Continued)

*Primary Examiner* — James R Marandi
(74) *Attorney, Agent, or Firm* — Meagher Emanuel Laks Goldberg & Liao, LLP

(57) ABSTRACT

A system for selecting one of a plurality of video versions in response to a video request by a user of a user device having a processor is disclosed. The system includes a stream selector configured to adaptively select optimized bit-rates by selecting one of the plurality of video versions to deliver to the user device. The stream selector i) estimates an expected future utility of the user at different times during a billing cycle based on a remaining data quota and ii) selects one of the plurality of video versions that maximizes a current utility plus expected future utility of the user at selection time. A user profiler may be configured to perform predictive analysis of user data usage by determining the likelihood of a user requesting a video during each time interval of the user's billing cycle and a video type including utility vector and cost vector information. A video profiler may be configured to generate a plurality of utility vectors and cost vectors, each version of a video having a different bit-rate and an associated utility vector and cost vector.

26 Claims, 10 Drawing Sheets

(51) Int. Cl.
H04N 21/258 (2011.01)
H04N 21/2343 (2011.01)
H04N 21/262 (2011.01)
H04N 21/2662 (2011.01)
H04N 21/45 (2011.01)
H04N 7/16 (2011.01)
H04L 12/14 (2006.01)

(52) U.S. Cl.
CPC ... *H04N 21/2662* (2013.01); *H04N 21/26225* (2013.01); *H04L 12/14* (2013.01); *H04L 12/1417* (2013.01); *H04N 7/162* (2013.01); *H04N 21/4516* (2013.01)

(56) References Cited

OTHER PUBLICATIONS

"Cisco Visual Networking Index: Global Mobile Data Traffic Forecast Update", 2012.
"Rogers Hi-speed Internet FAQ", http://www.keepingpace.ca/faq.html, 2014.
"Reliance 3G Plans & Pricing", <http://www.rcom.co.in/Rcom/personal/3G/HTML/PostpaidDataPlans.html, 2014.
A. Troianovski, "AT&T May Try Billing App Makers", Wall Street Journal, Feb. 28, 2012.
C. Liu , I. Bouazizi, M. Gabbouj, "Rate Adaptation for Adaptive HTTP Streaming", ACM MMSys, 2011.
J.D. Papastavrou, S. Rajagopalan, A.J. Kleywegt, "The Dynamic and Stochastic Knapsack Problem with Deadlines",Management Science, 1996.
P.R. Winters, "Forecasting Sales by Exponentially Weighted Moving Averages", Management Science 6(3):324-42, 1960.
"Recommendation BT.500: Methodology for the subjective assessment of the quality of television pictures", International Telecommunication Union, 2012.
Y. Wang, M. Schaar, S. Chang, A.C. Loui, "Classification-Based Multidimensional Adaptation Prediction for Scalable Video Coding Using Subjective Quality Evaluation", in IEEE Trans. Circuits Sys. Video Tech., 15(10):1270-8, 2005.
M. Zink, K. Suh, J. Guy, J. Kurose, "Watch Global Cache Local: YouTube Network Traces at a Campus Network Measurements and Implications", IEEE MMCN, 2008.
Y. Zhou,D. Chakrabarty, R. Lukose, "Budget Constrained Bidding in Keyword Auctions and Online Knapsack Problems", WWW, 2007.
S.F. Chang, A. Vetra, "Video Adaptation: Concepts, Technologies, and Open Issues", in Proc. IEEE, 93(1):148-58, 2005.
S. Ha, S. Sen, C. Joe-Wong, Y. Im, M. Chiang, "TUBE: Time-Dependent Pricing for Mobile Data", ACM SIGCOMM, 2012.
R. Rejaie, M. Handley, D. Estrin, "Quality adaptation for congestion controlled video playback over the Internet", ACM SIGCOMM 1999.
J. Liu, B. Li, Y. Zhang, "An End-to-End Adaptation Protocol for Layered Video Multicast Using Optimal Rate Allocation", in IEEE Trans. Mult., 6(1):87-102, 2004.
R.H. Jan, C.P. Lin, M.S. Chern, "An optimization model for Web content adaptation", Computer Networks 50 (7):953-65, 2006.
F. Dobrian, V. Sekar, A. Awan, I. Stoica, D.A. Joseph, A. Ganjam, J. Zhan, H. Zhang, "Understanding the Impact of Video Quality on User Engagement", ACM SIGCOMM, 2011.
X. Liu, F. Dobrian, H. Milner, J. Jiang, V. Sekar, I. Stoica, H. Zhang, "A Case fo a Coordinated Internet Video Control Plane", ACM SIGCOMM, 2012.
"Global Interet Phenomena Report", Sandvine, 2012.
K.T. Chen, C.Y. Huang, P. Huang, C.L Lei, "Quantifying Skype User Satisfaction", ACM SIGCOMM, 2006.
Marchetti-Spaccamela, Vercelis et al., "Stochastic on-line knapsack problems," Mathematical Programming, 68:73-104, 1995.
Chakrabarty, Zhou Y, Lukose et al., "Online Knapsack Problems,"http://www.seas. upenn.edu/ deepc/PUBS/CZK-full.pdf 2013.
U. Von Luxburg, "A Tutorial on Spectral Clustering", in Statistics and Computing, 2007.
C. J. Van Den Branden Lambrecht, "Perceptual models and architecutres for video coding applications," PhD dissertation, Ecole Polytechnique Federale de Lausanne EPFL, Lausanne, Switzerland, 1996.
D. Brezeale, D. J. Cook, "Automatic Video Classification: A Survey of the Literature", IEEE Trans. Sys., Man, Cybernetics, pp. 416-430, May 2008.
Y. Wang, M. Van Der Schaar, S. Chang, A. C. Loui, "Classification-Based Multidimensional Adaptation Prediction for Scalable Video Coding Using Subjective Quality Evaluation", IEEE Trans. Circuits Sys. Video Tech., pp. 1270-1278,Oct. 2005.
Y. Wang, J.-G. Kim, S.-F. Chang, "Content-Bassed Video Adaptation for Universal Multimedia Access (UMA) and Content-Based Utility Function Prediction for Real-Time Video Transcoding", IEEE Trans. Multimedia, pp. 213-220, Sep. 2007.
Allot Mobile Trends Report, http://www.allot.com/MobileTrends_Report_H1_2010.html, 2010.
S. Jeannin, A. Divakaran, "MPEG-7 Visual Motion Descriptors", IEEE Trans. Circuits Sys. Video Tech., pp. 720-724,Jun. 2001.
X. Sun, B. S. Manjunath, A. Divakaran, "Representation of motion activity in hierachical levels for video indexing and filtering", in Proc. Int. Conf Image Proc., pp. 149-152, 2002.
Y. Liang, I. Ahmad, "Power and Content Aware Video Encoding for Video Communication Over Wireless Networks", in Proc. IEEE Workshop Signal Processing Systems, pp. 269-274, Oct. 2004.
R, Shmueli, O. Hadar, R. Huber, M. Maltz, M. Huber, "Effects of an Encoding Scheme on Perceived Video Quality Transmitted Over Lossy Internet Protocol Networks", IEEE Trans. Broadcasting, pp. 628-640, Sep. 2008.
V. Paxson, "Empirically-Derived Analytic Models of Wide-Area TCP Connections," IEEE/ACM Trans. Networking, 1994.
G. Lueker, "Average-Case Analysis of Off-Line and On-Line Knapsack Problems", Society for Industrial and Applied Mathematics Philadelphia, 1995.
Yunhong Zhou, "An Algorithm for Stochastic Multiple Choice Knapsack Problem and Keywords Bidding", WWW, 2008.
Nikolaos Kontorinis, Yiannis Andreopoulos, Mihaela Van Der Schaar, "Statistical Framework for Video Decoding Complexity Modeling and Prediction", IEEE Transactions on Circuits and Systems for Video Technology, vol. 19, No. 7, July 2009.
R.H. Jan, C.P. Lin, M.S. Chern, "An optimization model for Web content adaptation," Computer Networks 50, pp. 953-965, 2006.
Jiasi Chen et. al, QAVA: Quota Aware Video Adaption Technical Report; published Dec. 30, 2013.

* cited by examiner

QUOTA AWARE VIDEO ADAPTATION

CROSS-REFERENCE TO RELATED APPLICATIONS

This application claims the benefit of U.S. Provisional Application No. 61/843,537, entitled "Quota Aware Video Adaptation (QAVA)", filed Jul. 8, 2013, the disclosure of which is incorporated herein by reference in its entirety.

BACKGROUND OF THE INVENTION

There are two basic trends in conflict with each other with regards to video streaming. The first trend is that users are watching more and more streaming video on their mobile devices. The "Cisco Visual Networking Index: Global and North America Mobile Data Traffic Forecast Update" for 2013-2018 predicts that by 2018, the average mobile user across the globe will exceed 3 GB of data usage each month, up from 356 MB in 2013, and almost 70% of the data usage will be from video alone.

The second trend is that mobile network carriers, in order to build and maintain a high-speed network capable of catering to this increasing data hunger, are increasingly utilizing tiered or usage-based pricing schemes, with significant penalties for overages.

Users, ISPs, and content providers (CP) all have interests in handling this conflict. Users desire to stop worrying about monthly data plans and watch all the videos they want with minimal distortion. An ISP may desire to either (a) reduce data traffic to lower network congestion and thereby operational and capital expenditure costs, or (b) preserve traffic to continue receiving fees from customers and/or content providers. And CPs have three potential desires: (a) allows a user to access more content under the same data plan, and in so doing, achieve greater profit for the CP by increasing advertising revenue; (b) CPs can market a solution as a competitive advantage over other CPs; and (c) doing so reduces the potential need for the CP to pay the ISP for the customer's data charges.

There are two main approaches to handling this conflict between the two trends. The first approach is to force, or at least default to, the use of low-quality video at all times for mobile users. This is the solution chosen for the YouTube mobile app, as well as by Netflix for Canadian mobile users, but low quality video may be of such low quality that it is barely tolerable. The second approach is to provide a warning when users near or reach their data usage limit, which leads to unsatisfied users, as they likely will still incur large overage charges. Therefore, to prevent unsatisfied users, bitrates must be optimized across an entire billing cycle.

This optimization problem is known as the Multiple-Choice Knapsack Problem (MCKP). In the regular single-choice knapsack problem, a set of items is given, each with an associated value and weight. The objective is to pick a subset of the items such that the total value is maximized while not exceeding the knapsack capacity. In the stream selection problem, the items are the individual bit rate versions of the videos, and the multiple choices arise because exactly one version of each video must be selected.

For a video request arriving at time t, a decision vector $x_t = (x_{t1}, \ldots, x_{tM})$ is defined, where each $x_{tj}$ takes the value 1 if bit rate version j is chosen, and 0 otherwise. Then the problem is:

maximize $\sum_{t=1}^{T} \sum_{j=1}^{M} u_{tj} x_{tj}$, subject to $$\sum_{t=1}^{T} \sum_{j=1}^{M} c_{tj} x_{tj} \leq B \text{ and } \sum_{j=1}^{M} x_{tj} = 1, \forall t, \text{ with variables}$$
$$x_{tj} \in \{0,1\}, \forall t,j \qquad (1)$$

where the first constraint says that the cost of the selected bit rates for all the videos requested in a billing cycle must not exceed the quota B, and the second constraint says that one bit rate version may be selected for each video.

The traditional offline version of the MCKP, where all the input items are known in advance, is well studied. The problem is NP-hard, but pseudo-polynomial time dynamic programming (DP) solutions exist. The offline algorithm solves problem (1) with the knowledge of all future video requests. It achieves the best possible performance and is treated as the benchmark against which the performance of any online algorithm must be measured. This is called the hindsight offline optimal algorithm.

Contrary to this offline theoretical version, any actual system that optimizes bit rates of streaming videos does not know the video requests in advance, and so needs to make decisions in an online fashion. This requires a modification to the formulation to handle online requests.

Zhou et al. presents an online algorithm to solve (1) regardless of the sequence of video requests. This is called the online MCKP algorithm. The MCKP algorithm uses relatively little information, needing only the maximum and minimum utility-to-cost ratio across all requested videos, and an estimate of the sum data of the smallest bit rates. The MCKP algorithm does not use prediction or time deadlines, but requires only the quota.

Because of this, however, the MCKP algorithm optimizes for the worst-case performance, rather than expected performance. Therefore, its performance is often suboptimal. A system that allows a user to view videos at a near-optimal video quality across an entire billing period for any given user without exceeding the user's bandwidth quota is therefore desirable.

BRIEF SUMMARY OF THE INVENTION

A system for selecting one of a plurality of video versions in response to a video request by a user of a user device having a processor is disclosed. The system includes a stream selector configured to adaptively select optimized bit-rates by selecting one of the plurality of video versions to deliver to the user device. The stream selector estimates an expected future utility of the user at different times during a billing cycle based on a remaining data quota. The stream selector selects one of the plurality of video versions that maximizes a current utility plus expected future utility of the user at selection time. The system may also include a profiler configured to perform predictive analysis of user data usage by determining the likelihood of a user requesting a video during each time interval of the user's billing cycle and a video type including utility vector and cost vector information and transmitting at least a portion of the predictive analysis to the stream selector. The system may also include a video profiler configured to generate a plurality of utility vectors and cost vectors, the plurality of video versions having different bit-rates, each bit-rate having an associated utility vector and cost vector.

The stream selector may be configured to select one of the bit-rates for the requested video based on the predictive analysis, the utility vector and cost vector for each of the bit rates of the requested video and a current time period associated with the requested video. The plurality of video versions may have different bit rates and the video bit-rate can be selected by retrieving pre-encoded videos from a server or by transcoding the video in response to the video request. The video profiler may be configured to store the plurality of utility vectors and cost vectors for pre-encoded videos or generate the plurality of utility vectors and cost vectors by transcoding the video in response to the video request, the video profiler being configured to transmit at least a portion of the plurality of utility vectors and cost vectors to the stream selector.

The system may also include a user request database coupled to the user profiler, the user request database being configure to store a historical user profile including a utility vector, cost vector and time stamp of each video requested by the user device over prior billing cycle. The user profiler and user request database may be co-located in the user device. The video database may be configured to store the requested video and the utility vector and cost vectors for each of the plurality of bit rates. The stream selector and video profiler may be co-located with a video database. The video profiler and video database may be co-located with a content provider server and the stream selector is located at separate server. The video database may be located at a content provider server and the stream selector, video profiler and user profiler are located at a separate server.

The video profiler may be configured to generate at least one utility vector by multiplying a peak signal-to-noise ratio by a duration of the video. The video profiler may be configured to generate at least one utility vector based on mean opinion scores. The video profiler may be configured to generate at least one cost vector based on a number of bytes in the version of the video requested.

The user profiler may be configured to receive a feedback score from the user representing a quality of the selected one of the plurality of video versions, the user profiler being configured to generate a personalized video utility score based on the feedback score. The stream selector may be configured to select one of the bit-rates for the requested video based on the personalized video utility score.

A method for selecting one of a plurality of video versions in response to a video request by a user of a user device is also disclosed. The method includes adaptively selecting optimized bit-rates by selecting one of a plurality of video versions to deliver to the user device, by estimating an expected future utility of the user at different times during the billing cycle based on a remaining data quota and selecting one of the plurality of video versions that maximizes a current utility plus expected future utility of the user at selection time. The predictive analysis of user data usage may be performed by determining the likelihood of a user requesting a video during each time interval of the user's billing cycle and a video type including utility vector and cost vector information and transmitting at least a portion of the predictive analysis to the stream selector. A plurality of utility vectors and cost vectors may be generated, the plurality of video versions having a different bit-rates, each bit-rate having an associated utility vector and cost vector. Once of the bit-rates for the requested video may be selected based on the predictive analysis, the utility vector and cost vectors each of the bit rates of the requested video and a current time period associated with the requested video.

The plurality of video versions may have different bit rates and the video bit-rate can be selected by retrieving pre-encoded videos from a server or by transcoding the video in response to the video request. The plurality of utility vectors and cost vectors may be stored for pre-encoded videos or the plurality of utility vectors and cost vectors may be generated by transcoding the video in response to the video request. A historical user profile may be stored and may include a utility vector, cost vector and time stamp of each video requested by the user device over prior billing cycle. At least one utility vector may be generated by multiplying a peak signal-to-noise ratio by a duration of the video. A least one utility vector may be generated based on mean opinion scores. At least one cost vector may be generated based on a number of bytes in the version of the video requested. A feedback score may be received from the user representing a quality of the selected one of the plurality of video versions and a personalized video utility score may be generated based on the feedback score. One of the bit-rates for the requested video may be selected based on the personalized video utility score.

DETAILED DESCRIPTION OF THE INVENTION

Disclosed herein is a quota-aware video adaptation (QAVA) system and method that generally uses a Stream Selector (SS) taking inputs from a User Profiler (UP) and a Video Profiler (VP) to select a particular bit rate and pre-emptively compress the more compressible videos early in the billing cycle. The VP provides information related to a video, such as its compressibility, which measures the extent to which the size of a video can be reduced without a significant distortion in quality. The UP predicts consumer usage patterns from past history and customizes the system to every user's flavor for watching certain types of videos. The SS then uses the information provided by the VP and UP optimizes QAVA for each user based on her monthly data quota.

In one example the QAVA system is separated into three modules: SS, UP, and VP. One advantage of this modularization is that the methodology and parameters can be modified without changing the architecture of the rest of the system, thus simplifying testing and maintenance.

It should be understood that other types of module separation and interconnections are also possible. For example, the VP and SS can be combined into a single module performing joint optimization. In operation, the stream selector requests videos of certain compressibility, and the video profiler optimizes over various codecs to generate videos with desired characteristics. This would provide a finer decision granularity to the stream selector, but is computationally complex since the video profiler also runs video encoding operations.

Figure 1:
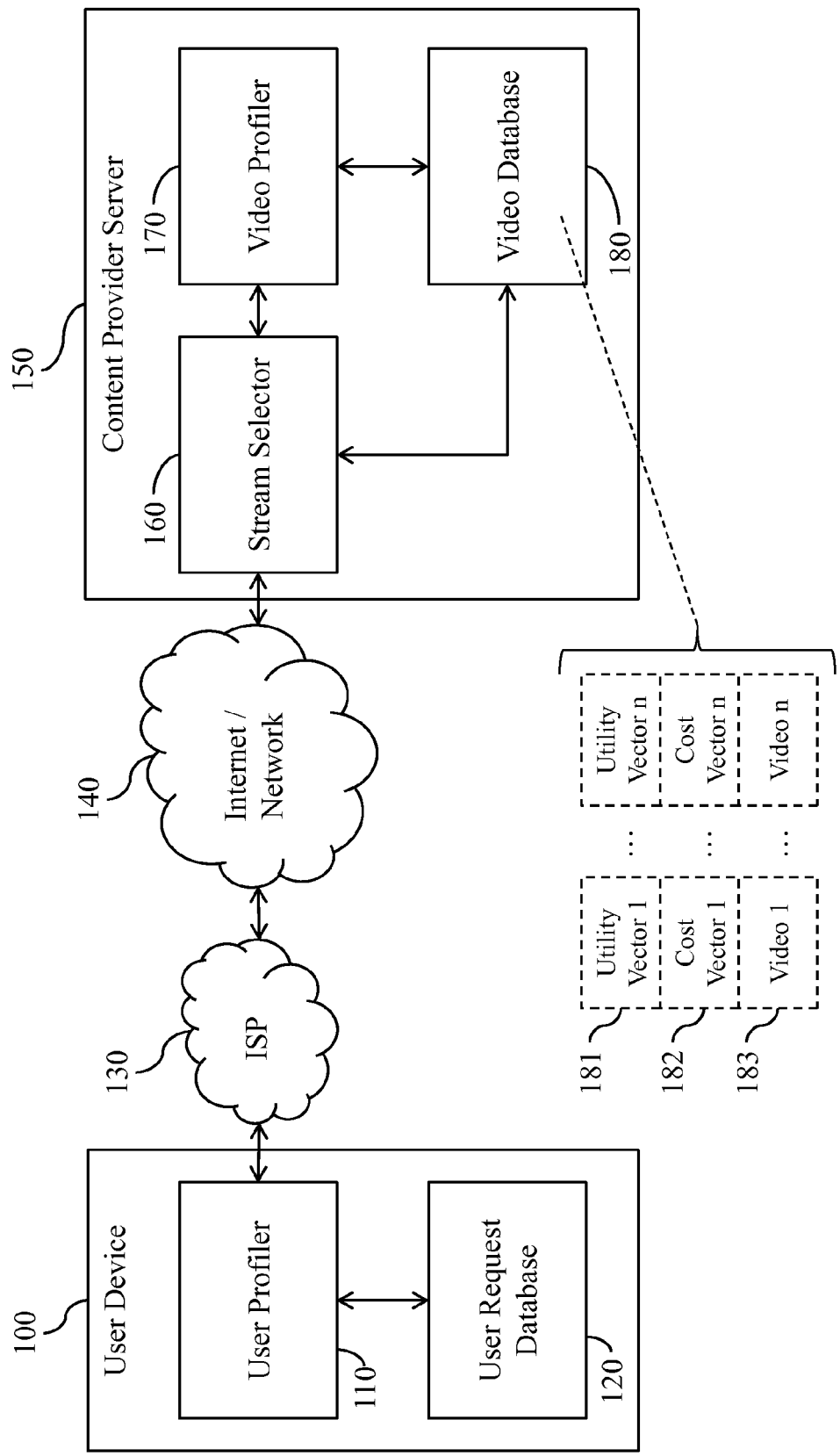
FIG. 1 is a schematic illustration of a QAVA-enabled system configuration.

The typical placement of the UP and VP is fairly intuitive. FIG. 1 shows an example of a system configured to select a streaming video bit rate. The system includes a computer server 150 configured with a stream selector 160 coupled to a video database 180. The video database may be implemented in a variety of formats as is well known in the art and generally provides storage and/or index information to allow for the retrieval of one of a plurality of videos available for playback. The stream selector 160 is also coupled to a VP 170 which is also coupled to video database 180. FIG. 1 also shows a user device 100 that is coupled to the computer server 150 via an ISP 130 and Internet 140. It should be understood that the user device may implemented in a variety of configurations including general computing devices including desktop computers, laptop computers, tablets, network appliance and the like. The user device may also be implemented as smart phone or other network based device having access to one or more networks or the Internet. The user device 100 includes a user profiler (UP) 110 and a user request database 120. The user request database may also be implemented in a variety of formats and generally stores historical information relating to the user's prior video playback requests. It should be understood that the user request database 120 may be initialized with default values when no prior historical exists and historical information is then stored or updated as requests for video playback occur.

In general, the CP controls the video content stored in the video database 180. Profiling the video on the user device 100 is possible but will typically increase the load on the user device's CPU and battery. However, as the UP 110 logs user data into a user request database 120, it can be placed on the user device 100 to alleviate user concerns over data collection and privacy.

Figure 2:
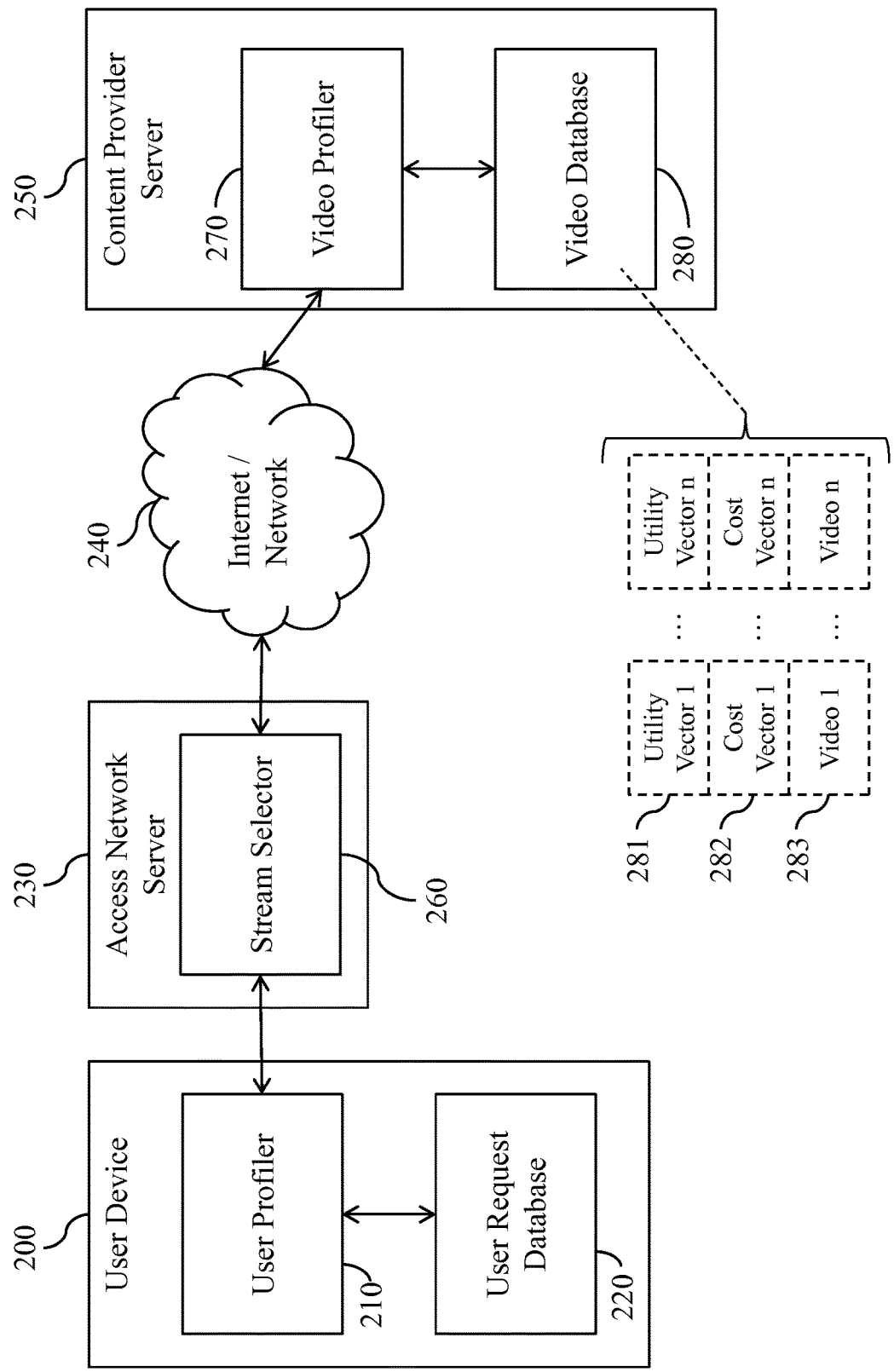
FIGS. 2 and 3 are other schematic illustrations of QAVA-enabled system configurations.

The location of the SS is typically not so intuitive. For every video request, the SS requires inputs from both the UP and VP. One possibility is shown in FIG. 2. In this example, the system includes a user device 100 including a user profiler (UP) 110 and a user request database 220. The SS 260 is placed in an access network server 230. It should be understood that the access network server located may be located at an Internet service provider (ISP). The system includes a computer server 250 configured with VP 270 which is coupled to video database 180. The user device 200 is generally coupled to the computer server 250 via an Internet connection shown generally by reference number 240.

In order to satisfy a video request, the SS 230 receives the video compressibility (utility and cost) from the VP module 270 located on the CP server 250, and the user information from the UP 200 located in the user device 200. After receiving these inputs, the SS 260 selects the bit rate (selected bit rate) as discussed in more detail below. The stream server then sends a request to the CP server 250 to transmit the actual video at the selected bit rate. Overall, this results in unnecessary messages and potential delay, which is undesirable for delay-sensitive traffic such as video.

Placing the SS on the CP's server is thus typically more desirable. As seen in FIG. 1, the SS 160 is located on the CP server 150. The video sequence associated with the selected bit rate is then streamed through the internet or backbone 140 to the ISP or access network 130 to the user's mobile device 100. This configuration also makes QAVA complementary to other video adaptation approaches. Placing the SS 160 and VP 170 on the CP's server 150 incurs some monetary cost to the content provider, which must be overcome by the advantages. However, the cost to the content provider is typically small: it must install the SS on its server (one-time), and compute the video profiles of all videos (a small amount of text data compared to video data size).

The relationship between the different functional blocks, such as their typical inputs, outputs, and an example of their update frequencies is as follows. The SS receives the following inputs: compressibility (utility and cost) of the requested video, the user's remaining monthly budget, and the user's profile from the UP module, e.g., predicted video request probability and video type distribution. For every request for a video, the SS processes the inputs, generates a selected bit rate and outputs the selected bit rate. The VP receives the set of all videos stored on the content provider server. The VP generates and outputs the compressibility (utility and cost) for each video. This may be performed once for each video. The UP receives the following inputs: a time stamp history for each of the user's past video requests and the compressibility (utility and cost) of those videos. The SS generates and outputs a predicted video request probability and a video type distribution (i.e., compressibility distribution) specific to that user. These quantities characterize the user's behavior and are fed to the SS. These predictions may be made at the beginning of the billing cycle.

In one exemplary embodiment, shown in FIG. 1, the content provider utilizes the VP 170 to compute and store in the video database 180 the compressibility (utility and cost) of all the videos on the server 150. In the beginning of each billing cycle, the UP 110 located in the user's mobile device 100, gathers previous request data from the user request database 120 and makes predictions (to be used in the current cycle) of the video request probability and the compressibility distribution based on its log of the past requests of the user. When the user requests a video in the current billing cycle, the request is sent through the ISP 130 and internet or network 140 to the SS 160 located on the CP server 150, which selects the bit rate to be delivered. The SS 160 sends the compressibility (utility and cost) of the requested video to the UP 110. The UP stores the compressibility (utility and cost) associated with the requested video as well as the timestamp of the request in the user request database 120. Once the current billing cycle is over, the UP 110 updates its predictions based on the recent request information stored in the user request database 120.

Figure 3:
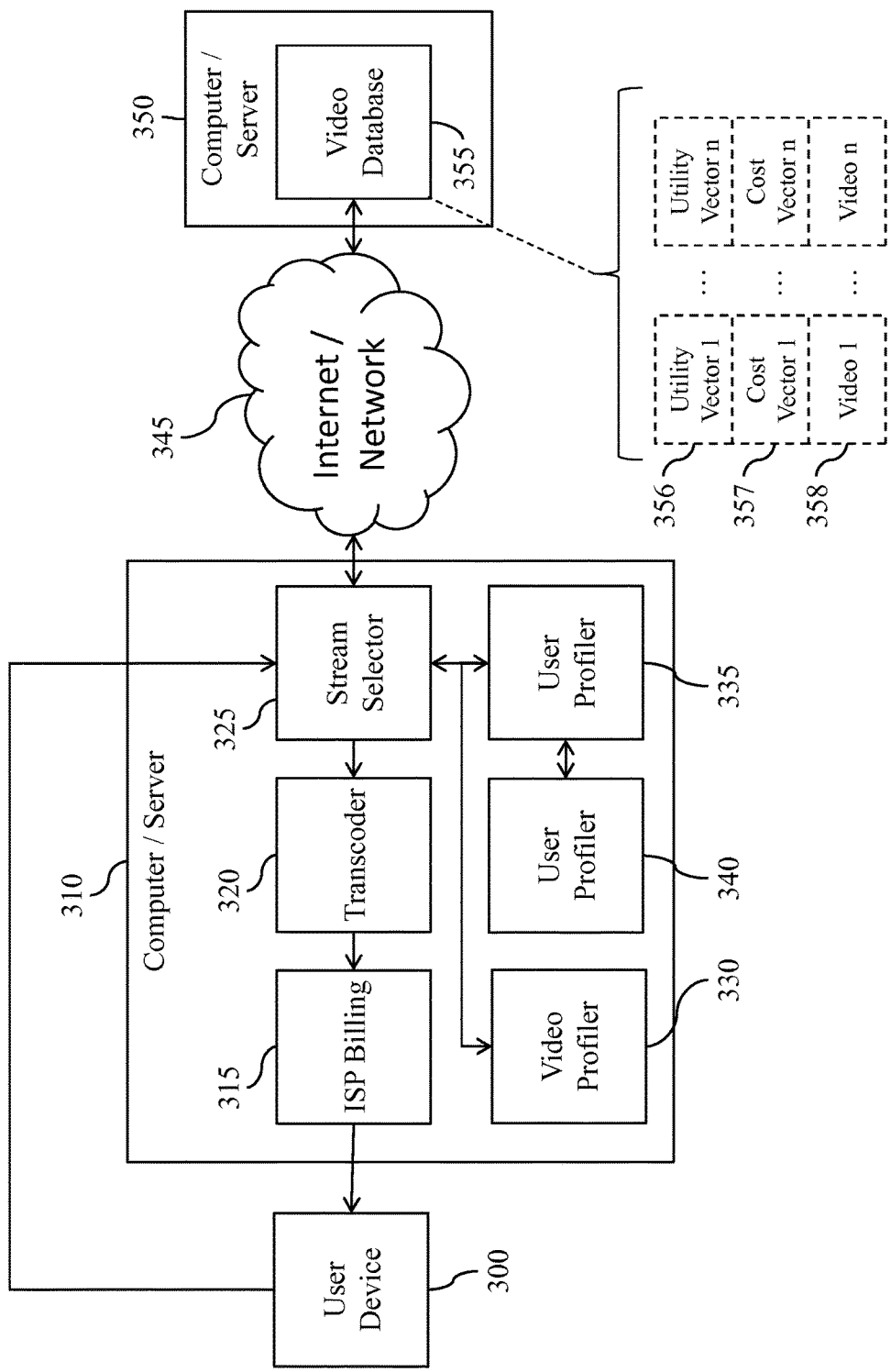

In another exemplary embodiment, shown in FIG. 3, the videos are not pre-encoded. In this example, the user profiler 335 is co-located with the stream selector 325 and video profiler 330 on a first server 310, e.g., located at the ISP. In this example, the UP 335 still gathers previous request data from the user request database 340 and makes predictions. When the user requests a video, the request is sent to the SS 325. The SS 325 then requests the video from the video database 355 located on the CP server 350. The requested video may then be sent to the VP 330 in order to determine the utility and cost vectors. Those vectors are then sent back to the SS 325 to calculate the optimal bit rate or selected bit rate. Once determined, the video is sent to the transcoder 320 to set the bit rate to the selected bit rate, and then, optionally, though the ISP billing unit 315 before being sent to the user's mobile device 300 for viewing. A more detailed description of each block in the system is presented below.

Video Profiler

Figure 4:
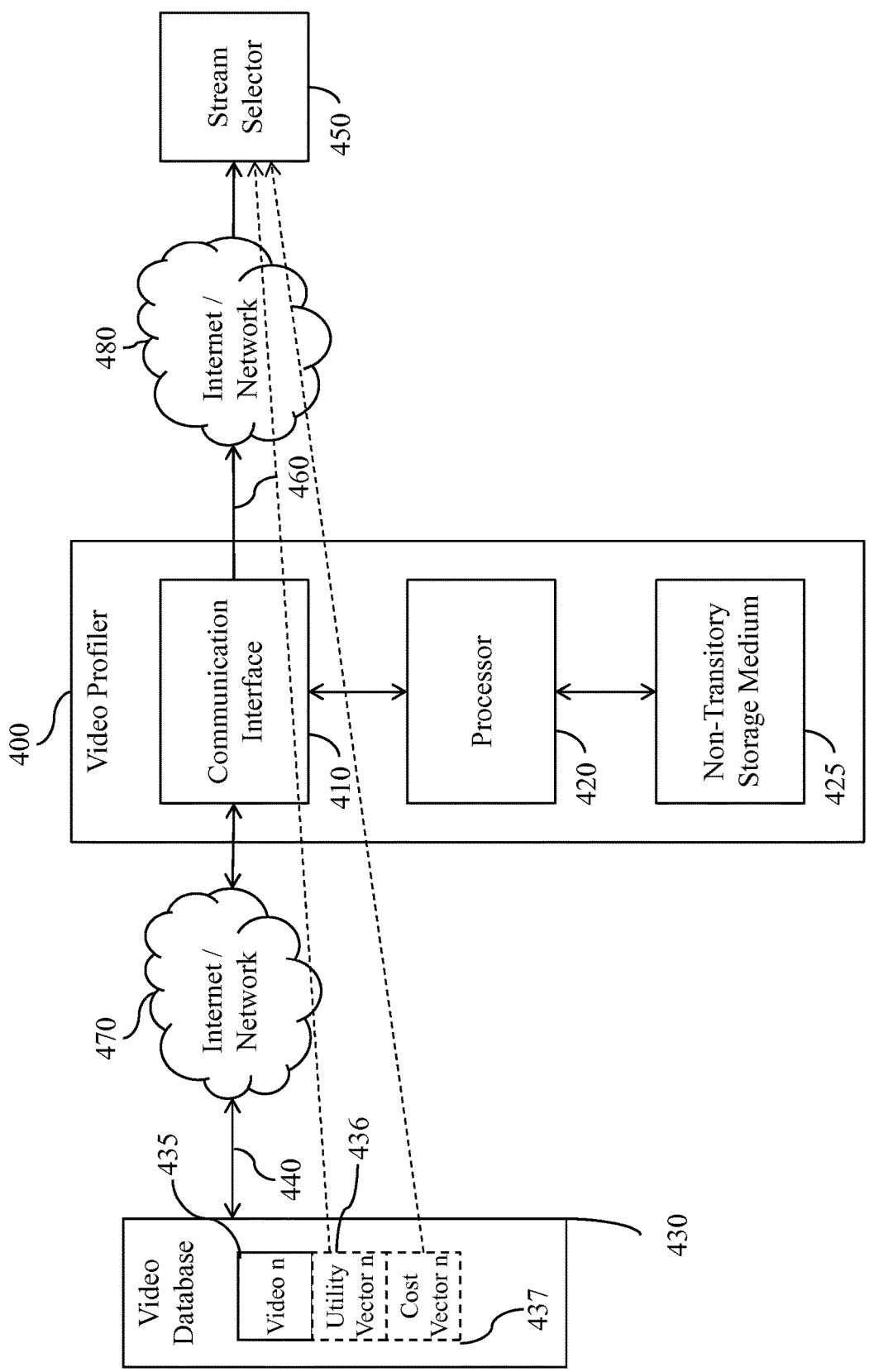
FIG. 4 is a block diagram of a user profiler configuration.

FIG. 4 shows a block diagram of a typical VP 400. The VP 400 generally includes a communications interface 410, a processor 420 and a storage medium 425. In order to minimize video distortion, the stream selector needs to know to what extent the requested video can be compressed and how much distortion it would cause in doing so. Different videos have different levels of compressibility depending on their spatial or temporal activity, as well as on the choice of encoder. For example, a talk show that has very little motion in it can be greatly compressed using an H.264/AVC encoder, whereas a motion-rich sports video may not be compressible to the same extent.

The SS is configured to carefully select the right bit rate for every video request to avoid the following undesirable situation. Suppose the SS selects a high bit rate for an easily compressible video when the user has a lot of quota left, possibly in the beginning of a month. Then it might be forced to select low bit rates for some not-so-easily compressible videos near the end of the billing cycle in order to stay within the monthly budget, thus causing significant distortion. A possible remedy is to choose low bit rates for easily compressible videos even when there is sufficient quota left. However, such intelligent online decisions can be made only if the system knows about the distortion vs. bit rate tradeoff for every video and can learn the quota consumption pattern over a billing cycle for each user. QAVA may employ an offline VP 170 effectively computes the utility and cost vectors for every bit rate of a given video and stores it on the content provider server 150, as shown in FIG. 1.

Traditional content providers pre-encode videos and store them on the content provider server. In this case, the associated utility and cost vectors can be stored in association with the pre-encoded videos. Alternatively, videos may be transcoded and adapted on-the-fly, which requires compressing the video dynamically at the particular bit rate determined by the SS. This can be a time-consuming operation and has significant implementation challenges; however, it would be capable of adapting video feeds for live events. In contrast, pre-encoded streams can be selected with minimal computation, but cannot handle video streams of live events.

Additionally, the channel should support the different bit rate versions of a given video from which the SS chooses i.e., each version having a different bandwidth requirement. These sustainable video bitrate versions may be pre-selected by the CP based on typical wireless or wireline bandwidth, or chosen on-the-fly based on bandwidth estimation techniques currently proposed for use in adaptive HTTP video streaming algorithms.

There are many estimation techniques for computing the quality of a video. One standard objective metric is the PSNR. The PSNR is a well-known objective metric for measuring video quality. A video typically comprises a sequence of images, and the PSNR for each image is defined as a function of the mean square error (MSE) between the original and compressed image. Mathematically, it is expressed in the logarithmic unit of decibel (dB) as $PSNR = 10\log_{10}(Q^2/D)$, where D is the pixel-wise MSE between the original and reconstructed image, and Q is the maximum pixel value (usually 255). The video PSNR is computed as the PSNR averaged over all images in the sequence. Typical PSNR values for lossy-video compression are between 20 and 30 dB, where higher is better.

Typically, then, the utility $u_{ij}$ of bit rate version j is computed as its peak signal-to-noise ratio (PSNR) multiplied by the duration of the video. Further, while PSNR is one exemplary method, there exist additional, potentially more accurate, metrics of video utility (e.g., Mean Opinion Scores or MOS), as well as means of calculating subjective metrics from objective measurements.

The cost of a video $c_{ij}$ is typically measured in bytes, as the data quota is often measured in bytes. In a QAVA system with pre-encoded bitrates, such as the system shown in FIG. 1, the video profiler calculates the utility and the cost in MB for all the videos only once. A typical utility—cost curve is concave with diminishing returns for utility at higher cost (or equivalently, higher bit rate, since bit rate is proportional to data size for a fixed-length video). A video with a flat utility-cost curve is "easily compressible" because lowering the bit rate decreases the utility only slightly. In contrast, a "hard-to-compress" video has a steep curve. These utility and cost vectors 181, 182 are stored in the video database 180 in association with the video 183 on the content provider server 150. In this example, the video database contains n videos, each having an associated utility vector and cost vector. A similar structure is shown in FIGS. 2 and 3, see e.g., reference numbers 281-283 and in FIG. 2 and reference numbers 356-358 in FIG. 3. It should be understood that there may be several copies of a given video, each video being encoded at a different bit rate, each video having a utility vector and cost vector for that bit rate.

In operation, the video database 430 sends a pre-encoded video 435 through connection 440 to processor 420. The database 430 may be located on the same server as the video profiler 400; if not, a connection through the network or internet 470 through an appropriate communication interface 410 may be used. The processor 420 then determines the utility vector 436 and cost vector 437 for the pre-encoded video 435. The utility vector 436 and cost vector 437 are sent to the Video Database 430 via connection 440 for storage in association with the video 435. The generation of a utility and cost vector may be repeated for each video of interest in the video database 430. The utility and cost vectors for a variety of bit rates for a given video are ultimately sent to the stream selector 450, e.g., via connection 460, for further processing.

Alternatively, in situations where videos are not pre-encoded, the video database 430 still sends the processor 420 each requested video 435 through connection 440. The processor 420 then determines the utility vector and cost vector for each of the various bitrates of video 435. The utility vector and cost vector for those bitrates is then sent to Stream Selector 450 via connection 460, which may require communication over the network or internet 480.

User Profiler

Figure 5:
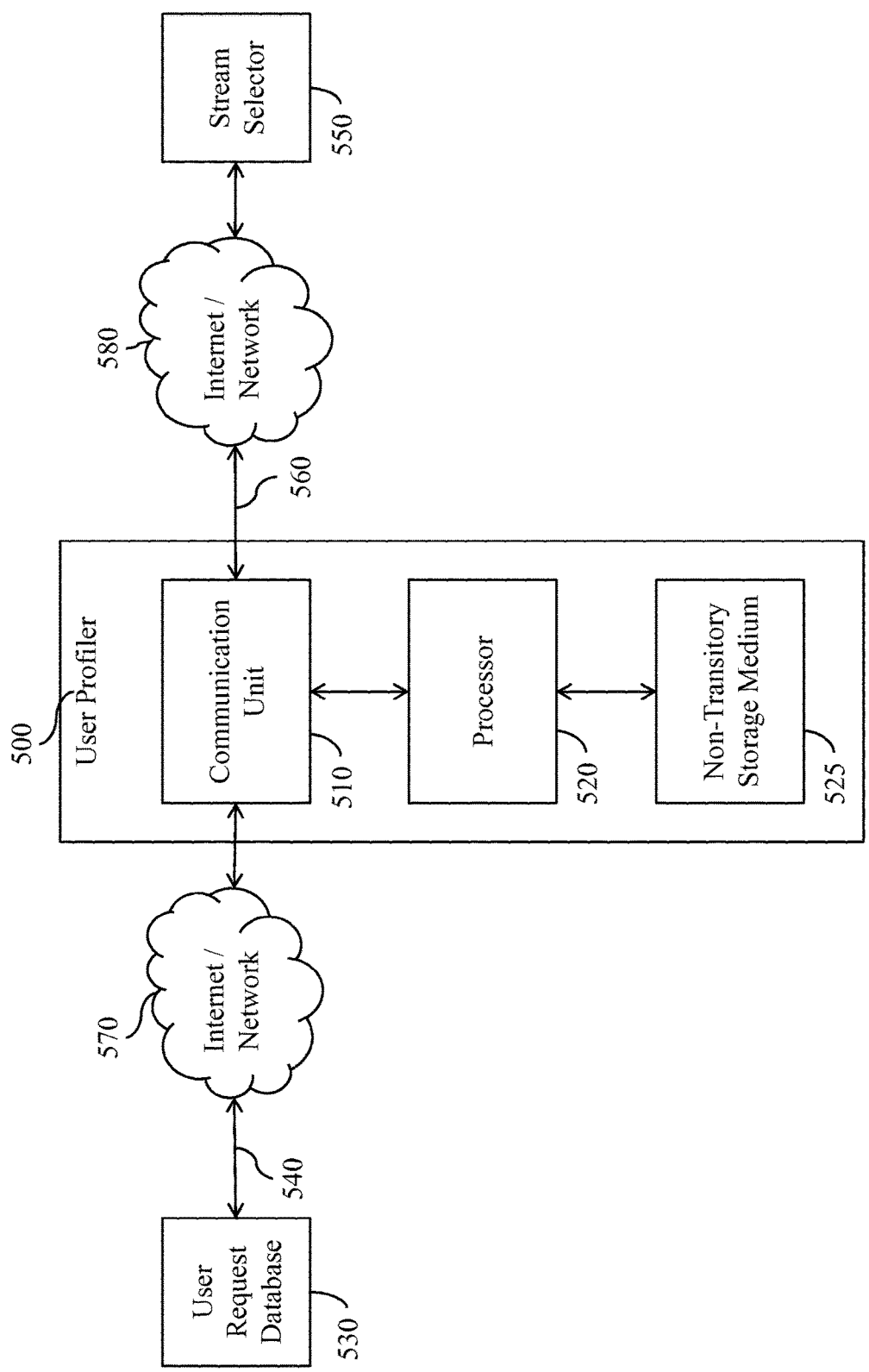
FIG. 5 is a block diagram of a video profiler configuration.

FIG. 5 is a block diagram of a user profiler (UP) 500. The UP 500 generally includes a communications unit 510, processor 520 and a storage medium 525. A user's past data consumption history gives an indication of her future usage pattern. Since the video requests from a user can arrive at different times without any prior knowledge, a prediction of these arrival times is helpful so the appropriate bit rates to serve the requests can be chosen. A simple usage pattern could be watching on average $x_d$ number of videos (or, equivalently, $y_d$ bytes) on day d of a week. When the number $x_d$ (or $y_d$) remains approximately the same for the same day d across different weeks, a weekly pattern may be noted. More complex usage behavior can lead to small-scale seasonal variations (daily or hourly) as well as trends, which are long term variations due to habitual changes that lead to a steady increase or decrease in data usage over months or years.

The UP 500 can be employed to find patterns in usage behavior and to predict future video requests. In particular, the UP 500 may be configured to characterize each user based on (i) the video request probability at each time interval, and (ii) the distribution of video types preferred by the user. The UP may be installed as an application 110 on a user device 100, for example as shown in FIG. 1.

Depending on their lifestyles, different users have different time preferences for watching videos. For example, some users prefer watching videos on weekends rather than on weekdays, while others watch more in the evening after working hours than in the mornings. The taste in content of the users can also be different. For example, some users watch sports videos more often than movie trailers, while some others watch more news clips than music videos. Such preferences in user behavior can lead to well-defined patterns, both in terms of the viewing times and the types of the videos being watched.

The UP is configured to estimate these temporal viewing patterns and video type preferences for each user. The UP does this based on inputs that include information on the user's past video request records, spanning e.g., the previous billing cycle, the entire history, etc.

Data usage under a single data plan can be decomposed into three usage layers: (i) multiple users, (ii) multiple devices per user, and (iii) multiple traffic types per device per user. Typically, the system utilizes video traffic per user per device; thus, the "video quota" per device should be set. To accommodate non-video data traffic, the video quota may be set to a percentage of the total data quota, based on historical video data usage. The system can be configured on per user basis by aggregating video request logs across devices. This results in coarser granularity user profiling, but may also improve performance by decreasing the sensitivity to noise.

In a typical system, the length of a billing cycle (e.g., month) is divided into T time intervals, indexed by t=1, ..., T, and assume that the user has a total budget B (measured in bytes) in one billing cycle. The length of this interval can be uniform or variable depending on the past data consumption history, and may be configured by a system parameter. In each time interval t, a video request arrives with a certain probability, which is denoted by $p_t$. The remaining budget of the user at time t is $b_t$. The request probability $p_t$ and budget $b_t$ are provided by the UP module for each user.

In each time interval t, there is a certain probability $p_t$ that the user requests a video. This request probability can either vary with each interval or be constant. One option is to compute the average request probability per interval, and set $p_t$ for each interval equal to this average. The average request probability is computed by summing the number of requests in the previous billing cycle and dividing by the number of periods T. The time interval should be set small enough so that the average request probability is less than 1, but not so small as to inhibit the computation of required matrices.

There are several alternative approaches, including fitting distributions and prediction-based techniques. The arrival rate of videos might follow a particular known distribution (e.g., Poisson), in which case the probability of an arrival can be computed directly from the distribution itself. Alternatively, one can use more sophisticated time series analysis techniques. For example, at the beginning of the billing cycle, one can predict the sequence of future viewing times in the upcoming billing cycle, and then compute the average request probability by adding up the predicted number of requests, and finally dividing that by the number of intervals. One can also design online algorithms, such as predicting the sequence of viewing times for intervals t+1, t+2, ..., T, while at interval t, and updating the predictions when a new video request arrives, or based on "triple exponential smoothing."

Such alternatives trade off accuracy versus computation need. The simple averaging technique previously mentioned results in a computation that requires less memory and power, and can be performed easily on a resource-constrained (in terms of battery and memory) client device.

The output of the UP includes a joint probability distribution P(u,c), which reflects a user's preference for watching different types of videos. For example, a user who watches a lot of sports videos (which are not-so-compressible) will have a different distribution from a user who watches a lot of talk shows (more compressible). This video type distribution can remain the same over the length of a billing cycle, or can be time-dependent, reflecting, for instance, the fact that a user watches more sports videos at night and more news clips in the morning. As a first-order approximation, it can be assumed that the distribution does not change with time. The type of distribution is computed once at the beginning of a billing cycle based on the video requests in the last billing cycle. Alternatively, this distribution can be updated more frequently or when certain triggers occur, e.g., a user who does not normally watch sports begins streaming Olympic events or World Cup games.

In one embodiment, the UP may computes the video type distribution as follows: Each video request arriving at time interval t in the previous billing cycle has a previously calculated utility-cost ($u_t$, $c_t$) pair associated with it. The probability distribution may be calculated by counting the frequency of each ($u_t$, $c_t$) pair from the last billing cycle, and then normalizing appropriately to form a probability distribution. Since the utility and cost are continuous variables, they can be binned for greater computational efficiency; however, this optimization may be unnecessary. A detailed description of the structure and generation of the offline table is set out below As shown in FIG. 5, user request database 530 provides the processor 520 with time stamp and utility-cost vectors for each video request in the last billing cycle through a connection 540. The database 530 may be located on the same server as the user profiler 500; if not, a connection through the network or internet 570 through an appropriate communication unit 510 may be necessary. The UP 500 using processor 520 calculates the video type joint probability distribution. The instructions that the processor 520 utilizes may be stored in non-transitory storage medium 525 on the same server as the UP 500. The video type joint probability distribution may then be stored on the user request database 530, on non-transitory storage medium 525, or sent directly to the stream selector 550, either directly or through a connection 560 to a network or internet 580.

Stream Selector

Figure 6:
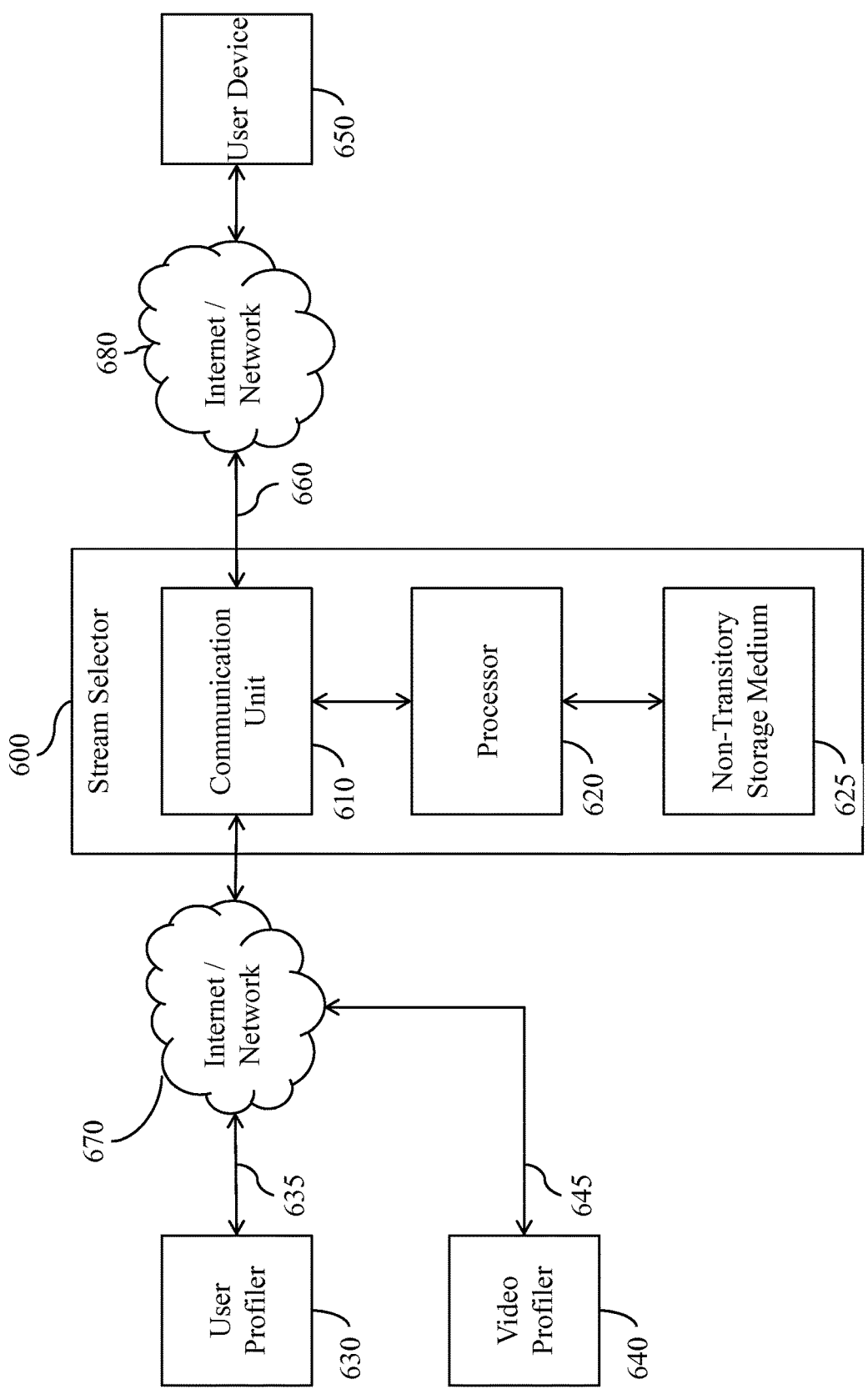
FIG. 6 is a block diagram of a stream selector configuration.

FIG. 6 shows a block diagram of a typical stream selector (SS) 600. The user profiler 630 and the video profiler 640 send the necessary information to the stream selector module 600. These functional blocks may be co-located on a single server as seen in FIG. 3, or may be completely separated spatially, as seen in FIG. 2. Therefore, the system may require connections 635 and 645 to a communication unit 610 through a network or internet 670. Instructions stored on non-transitory storage medium 625 are sent to processor 620, which determines the optimal bit rate based on the information provided from the other modules. The video sequence with the selected bit rate is then requested and streamed through connection 660 through the internet or network 680 to user device 650.

As explained above, the system selects an appropriate bit rate for every video request made by a user. This bit rate selection is based partially on two factors: (i) the user's data consumption pattern; and (ii) the particular video requested. The selection task is performed by the stream selector which may run on e.g., the content provider server, as shown in FIG. 1. In such a configuration, each video has multiple copies, each copy pre-encoded in a different bit rate and stored on the content provider server. The number of copies with different bit rates of a video is pre-determined by the content provider.

Unlike the traditional offline MCKP, video requests are typically revealed one-by-one online. Thus, existing DP solutions to the offline knapsack problem cannot be used. Online algorithms handle this situation by making a decision on-the-fly when a new video request arrives, without any prior knowledge of future requests. However, once a decision is made, it cannot be revoked or changed in the future.

Since the data quota resets after the billing cycle is over, there is a time deadline before which all actions must be made. The bit rate decisions for future intervals may not depend on the decisions taken at previous intervals, given the current remaining budget. The problem can be modeled as a finite-horizon Markov decision process (MDP). A key assumption is that the video requests are independent of time, and therefore the transition probabilities are stationary.

The MDP formulation allows the SS to make foresighted bit rate selection decisions by taking into account the future impact of its current decisions on the long-term utility. This is better than just an online algorithm that makes myopic decisions at every time step. For example, a greedy solution might choose a bit rate that maximizes the utility of the current request without overshooting the quota.

Figure 7:
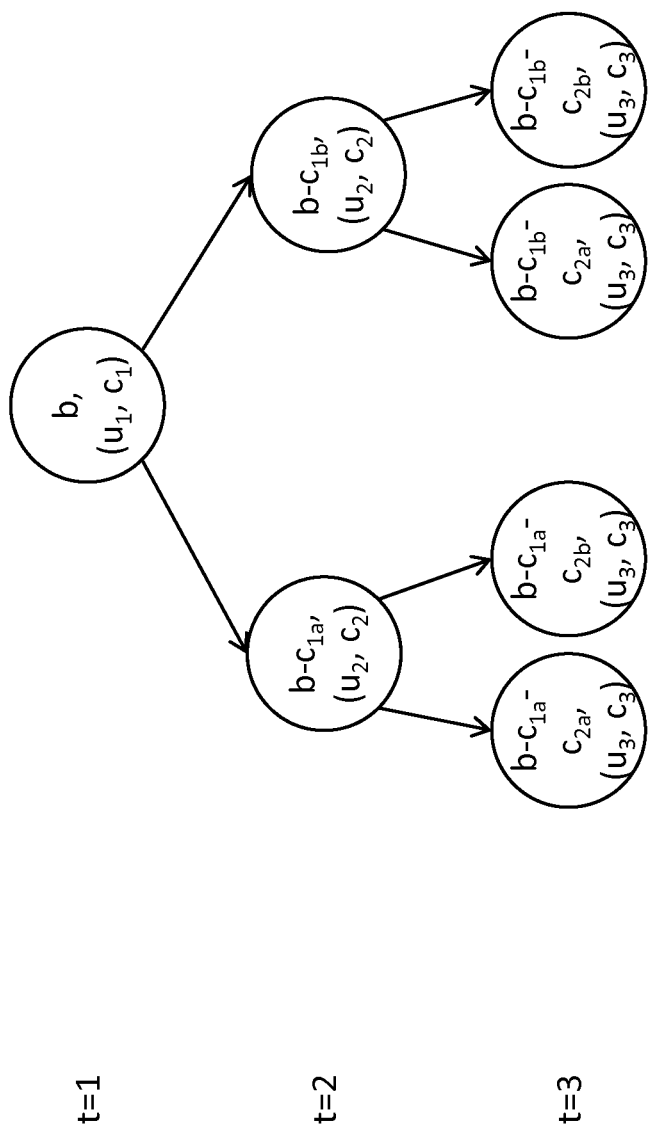
FIG. 7 is a diagram illustrating a decision tree involving multiple videos each compressed at two different bit rates.

FIG. 7 shows a simple example of choosing between two different bit rates over two time steps. The state of the system is defined as the four-tuple $s_t=(t, b, u_t, c_t)$, comprising the time intervals t, the remaining quota b, and the utility and cost vectors $u_t$ and $c_t$. There are two possible actions at each time step—choose the lowest bit rate or choose the highest bit rate. If the lowest bit rate is chosen, the system moves to time t+1 with remaining budget $b-c_{1a}$. The algorithm collects utility (reward) $u_{1a}$ and receives the new video request with utility and cost vectors $u_2$ and $c_2$. If the second bit rate is chosen, the system moves to time t+1, but now subtracts the cost $c_{1b}$ from its remaining budget, leaving it with $b-c_{1b}$. It also collects utility $u_{1b}$. At the next time step, a similar set of choices exists—choose the lowest or highest bit rate. If the lowest bit rate is chosen, the system moves to time t+2, but now subtracts the cost $c_{2a}$ from its remaining budget, and collects utility $U_{2a}$. Similarly, if the higher bit rate is chosen at time step 2, the system moves to time t+2, but now subtracts the cost $c_{2b}$ from its remaining budget, and collects utility $U_{2b}$. Thus, if the lowest bit rates were routinely chosen for the two time steps, the budget would contain $b-c_{1a}-c_{2a}$ bytes, and the system would have collected $u_{1a}+u_{2a}$ utility. Conversely, if the highest bit rates had been routinely selected, the budget would contain $b-c_{1b}-c_{2b}$ bytes, and the system would have collected $u_{1b}+u_{2b}$ utility.

The set of actions $\{x_1, \ldots, x_T\}$ taken by the algorithm at every time step is called a policy. A policy that solves the MCKP of (1) is called an optimal policy. If the arriving video requests were known, an optimal policy can be determined using the traditional offline techniques previously mentioned. However, since the video requests are not known a priori, the MDP finds a policy that instead maximizes the expected sum utility. This solution typically utilizes a combination of online and DP optimization.

Online Optimization

The optimal policy can be found using backward induction techniques for finite-horizon MDPs. The expected utility is accumulated from time t until the end of the billing cycle at time T, when the remaining quota is $b_t$. This expected utility assumes that the optimal action is applied in each state. Then, the optimal action at each time step t is found by solving Eq. (2).

The online portion in the SS is run each time the user makes a video request and decides which video bit-rate to download for the user. It uses the video type distribution table calculated by the UP to determine how each possible bit-rate choice it makes now would affect the future utility video utility. For example, the online portion determines that choosing a high bit-rate and spending a lot of data during the current time interval increases the user's utility for the current video, but depletes the remaining quota and reduces the future video utility.

For each received video request, the online portion solves the optimization problem in Eq. (2). The objective of the optimization problem is to maximize the utility of the current video, plus the expected utility in the future. The expected utility in the future depends on the quota spent on the current video. To solve the problem, the algorithm checks, for each possible video version tuple (utility, cost), what the utility of that version is, plus the future utility when that version's cost is subtracted from the remaining quota. The future utility is obtained by consulting the entry in the offline table that corresponds to the current time interval and remaining quota. The SS compares all the video versions and selects the version that maximizes the current utility plus the future utility. Video versions whose cost is more than the remaining quota are not considered in the comparison.

DP Optimization

Generation of data and subsequent processing using a video type distribution may be carried out as follows. In general, a goal of the disclosed approach is to maximize the cumulative video utility for the user over the duration of a billing cycle. The approach may be carried out in two parts: offline generation of a table via the UP, and online use of the table during bit rate selection by the SS.

The UP is generally configured to construct a table of size B rows×T columns, where B is the quote of the user, and T is the number of time intervals in the billing cycle, e.g., 30 minutes in this example, but this is a tunable parameter. Each entry in the table is the cumulative expected video utility that the user will receive in the remainder of the billing cycle. The offline table is constructed before the user's billing cycle begins, and estimates the future video utility of the user at any point during the billing cycle, for any remaining budget. For example, near the end of the billing cycle and with low budget, the future video utility is likely to be low because few videos remain, and also the user does not have the quota to spend on streaming high-quality videos.

The value of each entry in the table is computed as follows. Suppose we are at time t with remaining budget $b_t$, and a new video request arrives. Assuming that the algorithm chooses an optimal bit rate j* by solving the following:

maximize: $u_{tj}x_{tj}+U_{t+1}(b_t-c_{tj}x_{tj})$ subject to: $c_{tj}x_{tj} \leq b_t$ $$\Sigma_{j=1}^M x_{tj}=1 \qquad \text{Eq. (2)}$$

variables $x_{tj} \in \{0, 1\}$, $\forall j$,

Solving Eq. (2) above requires the computation of $U_t(b_t)$. Since $U(\bullet)$ is an expectation over all future requests, it does not change with every new request, and thus can be precomputed using DP before running the online portion. $U_t(b_t)$ is defined as the expected utility accumulated from time t until the end of the billing cycle at time T, when the remaining quota is $b_t$. This expected utility assumes that the optimal action is applied in each state.

The first constraint in Eq. (2) ensures that the cost of the selected bit rate is less than the remaining quota. The objective function has an intuitive meaning: It maximizes the current utility plus the sum of the expected utilities, subject to the remaining quota. The problem can be solved in O(M) time by discarding the bit rates that violate the constraints, and then picking the bit rate j* that maximizes the objective function. This can be solved every time a video is requested.

The expected accumulated utility is equal to the utility of the current request, plus the future utility accumulated from time t+1 onward, given that we have already spent $c_{ij}$* of our budget. This utility from time t+1 onward is unknown because the future video requests are unknown, and so we must take the expectation. Mathematically, this translates to:

$$U_t(b_t) = p_t(u_{ij}* + E_{(u,c)}[U_{t+1}(b_t - c_{ij}*)]) + (1-p_t)U_{t+1}(b_t). \qquad \text{Eq. (3)}$$

The $(1-p_t)$ term represents the probability that no video request arrives, and so no bit rate decision is made. The accumulated utility at time t is then equal to the utility at time t+1. An important component of any DP solution is the boundary condition that allows the initial values of U(•) to be calculated. In this example, the boundary condition is that the expected accumulated utility is 0 when the billing cycle is over, or the remaining budget is less than 0. The optimal action at time T−1 is to accept any video that fits in the remaining budget, and thus $U_{T-1}(b_{T-1})$ is known. Then using Eq. (3), the remaining entries of U(•) can be calculated. In this example, we choose the budget granularity to be 1, so $b_t$ takes on possible values 1, ..., B. The running time of computing the U(•) matrix is O(TBMΓ), where Γ is the cardinality of the set {(u, c)} in the video type distribution.

Starting at the bottom row of the table and moving upwards. All entries in the table except the bottom row are computed as follows. The value of the entry in row r and in column c consists of two parts: (a) for each possible video request, the utility of the version (utility, cost) that maximizes the video's utility plus the entry in row r+1 and column c-cost, averaged across all possible video requests; and (b) the entry in row r+1 and column c. Part (a) is multiplied by the probability of the user requesting a video, and part (b) is multiplied by the probability of the user not requesting a video, and the two parts are then summed. Video versions that have cost greater than the c are not considered in the computation of part (a).

For the entries in the bottom row of the table, for column c, the value is the utility of the video version whose cost is less than c, averaged across all possible video requests.

Figure 8A:
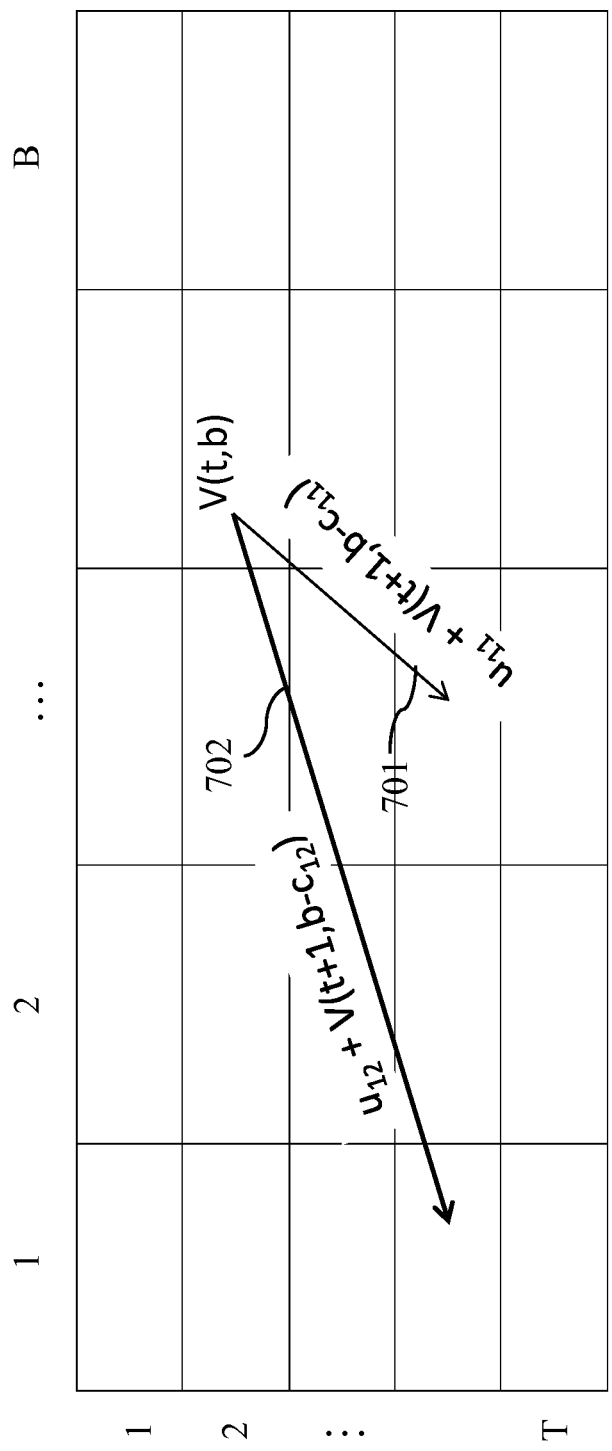
FIG. 8A shows the structure of a video type distribution table.

FIG. 8a shows the structure of a video type distribution table. For each version of the video, the UP computes the utility of the version plus expected future utility. For example, the left arrow 702 has the value $u_{12} + V(t+1, b-c_{12})$, which is the utility from version 2 of video 1. The right arrow 701 has the value $u_{11} + V(t+1, b-c_{11})$, which is the utility from version 1 of video 1. The algorithm compares all of these arrows and chooses the arrow that has the maximum value, which is shown in the figure by arrow 702.

Figure 8B:
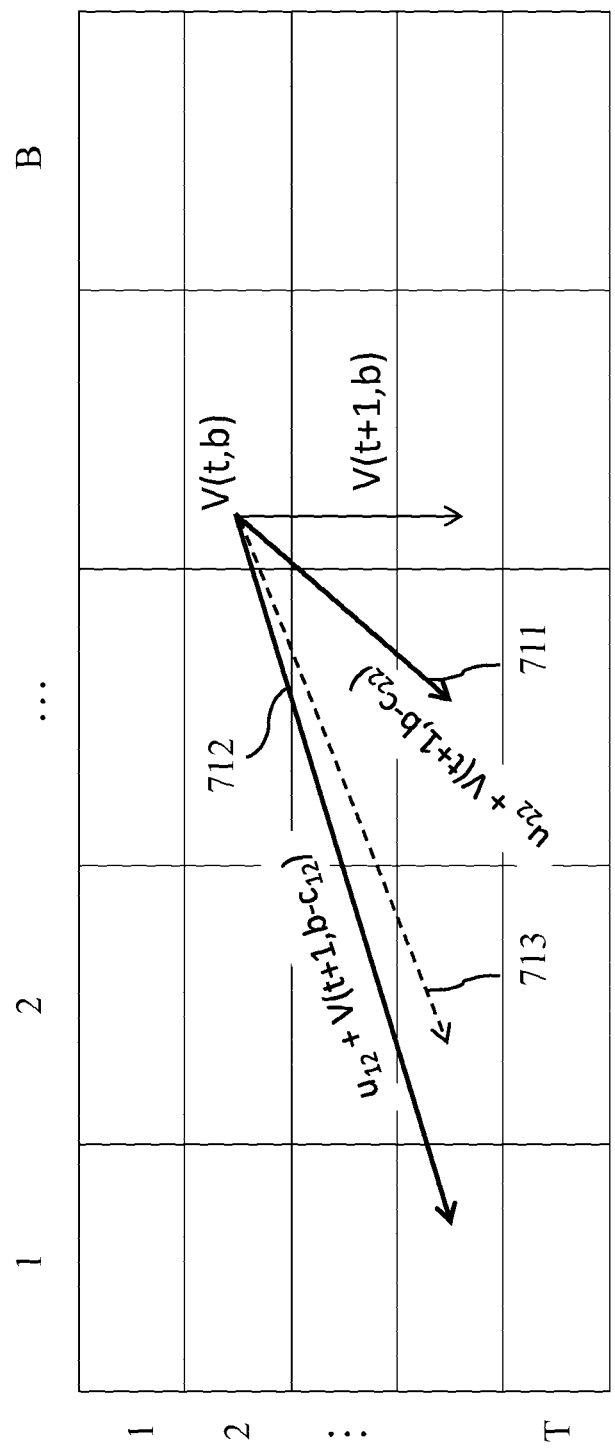
FIG. 8B shows the structure of a video type distribution table.

The UP repeats this procedure for each possible video, and ends up with a single arrow for each video. FIG. 8b shows the arrow associated with each video (the non-vertical thick arrows 711 and 712). The UP then computes the average arrow across all videos, as shown by the dashed arrow 713. This quantity is multiplied by the probability of a user requesting a video. The algorithm also computes the value of the vertical arrow, V(t+1,b), multiplied by the probability of no user request arriving. The final value of the entry is the sum of the dashed arrow plus the vertical arrow.

The online and offline components of the MDP stream selection algorithm are summarized above. In the special case of two bit rates (M=2), the MDP algorithm reduces to that of Papastavrou et al. With accurate user and video profiling, the approach maximizes the sum utility while staying under the quota. In the case of inaccurate inputs, however, the algorithm may exceed the quota. In that case, the algorithm should simply choose the lowest bit rate.

Time Scale of Video Adaptation.

There are two choices for the time scale of video adaptation: (i) inter-video adaptation; and (ii) intra-video adaptation. Inter-video adaptation is choosing a single bit rate stream for entire duration of the requested video, whereas intra-video adaptation involves dividing each video into smaller clips and choosing the correct adaptation operation for each clip.

Inter-video adaptation is suitable for video clips of short duration (e.g., YouTube videos of less than 5 minutes), because the spatial and temporal activity tends to be similar throughout the duration. However, for longer videos such as movies, it is more appropriate to stream different bit rate versions for different parts of the video depending on the spatial and temporal activity. This system can apply equally to inter- or intra-video rate switching. QAVA can be used for intra-video adaptation by considering each smaller segment as a separate video request. Such intra-video switching requires synchronous bit stream switching, which can be achieved with the advent of new video streaming protocols such as MPEG-DASH. QAVA can also work with existing channel-based switching algorithms by optimizing and restricting the rates available to the existing algorithm.

User Feedback

Figure 9:
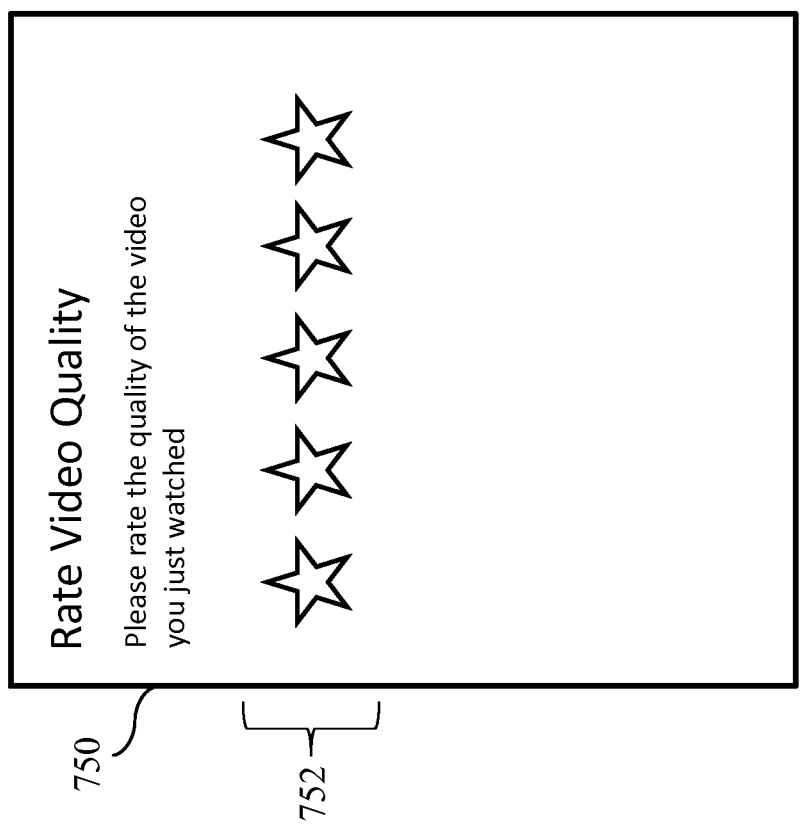
FIG. 9 is a block diagram of a user feedback screen.

The system may also include a user feedback mechanism, e.g. a pop-up screen in a mobile application running on the user device. FIG. 9 is an example of a user feedback screen 750. This screen accepts inputs from the user to provide a rating on the received video quality (after the bit rate is selected by the SS). The SS can be configured to adjust its subsequent choices of video bit-rate by calibrating the utility score of each video for each user. This calibration is based on the difference between the user's feedback score and the video profiler's objective MOS/PSNR score for the user. The feedback score is defined as the average difference between the user's feedback score and the video profiler's objective utility score, across all videos requested by the user in the past. For a given user, the stream selector takes the video profiler's utility score and adds the feedback score to produce the user's personalized video utility score. This personalized video utility score is used as the video utility in the calculation of the offline table and the online algorithm in the stream selector.

The feedback score may be stored by the user profiler for each user. The stream selector requests the feedback score from the user profiler when it computes the offline table and also when it runs the online algorithm when the user requests a video. After a video plays, the user is requested to rate the quality of the video. For example as shown in FIG. 9, 1 to 5 stars may be selected as shown by reference number 752, where 1 star is the lowest quality and 5 stars is the highest quality. The stream selector transmits this rating to the user profiler, which updates the feedback score of the user. The updated feedback score may be computed as the sum of all ratings given by the user divided by the number of ratings given.

Any references listed herein are also part of the application and are incorporated by reference in their entirety as if fully set forth herein. It should be understood that many variations are possible based on the disclosure herein. It should be understood that the system disclosed herein may be implemented using hardware and software stored on non-transitory computer readable media. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. It should be understood that such processors may be coupled to memory devices and input/output circuitry as is well known in the art. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention. Although features and elements are described above in particular combinations, each feature or element can be used alone without the other features and elements or in various combinations with or without other features and elements.

What is claimed is:

1. A system for selecting one of a plurality of video versions in response to a video request by a user of a user device having a processor, the system comprising:
   a computer server comprising at least one processor and a network interface card configured to connect to the user device via a network, wherein the processor comprises:
      a video profiler configured to provide compressibility information related to a video;
      a user profiler configured to predict usage patterns from a user history at the time of request; and
      a stream selector configured to pre-emptively select optimized bit-rates during a billing cycle by:
         selecting one of the plurality of video versions to deliver to the user device based on a current video utility,
         estimating an expected future utility of the user at different times during a billing cycle based on compressibility and usage patterns from a user history,
         selecting one of the plurality of video versions that maximizes the current video utility plus expected future utility of the user at selection time based on a remaining data quota, and
         transmitting, via the network, the selected video for display on the user device.

2. The system of claim 1, wherein the user profiler is further configured to perform a predictive analysis of user data usage by determining the likelihood of a user requesting a video during each time interval of the user's billing cycle and by determining a video type, which includes utility vector and cost vector information, and transmitting at least a portion of the predictive analysis to the stream selector.

3. The system of claim 2, wherein the video profiler is further configured to generate a plurality of utility vectors and cost vectors, wherein the plurality of video versions have different bit-rates, and each bit-rate has an associated utility vector and cost vector.

4. The system of claim 3, wherein the stream selector is further configured to select one of the bit-rates for the requested video based on the predictive analysis, the utility vector, and cost vector for each of the bit-rates of the requested video and a current time period associated with the requested video.

5. The system of claim 4, wherein the stream selector and video profiler are co-located with a video database.

6. The system of claim 3, wherein the video profiler is further configured to store the plurality of utility vectors and cost vectors for pre-encoded videos or generate the plurality of utility vectors and cost vectors by transcoding the video in response to the video request, and transmit at least a portion of the plurality of utility vectors and cost vectors to the stream selector.

7. The system of claim 3, further comprising a video database configured to store the requested video and its corresponding utility vector and cost vector for each of the plurality of bit-rates.

8. The system of claim 3, wherein the video profiler is configured to generate at least one utility vector by multiplying a peak signal-to-noise ratio by a duration of the video.

9. The system of claim 3, wherein the video profiler is configured to generate at least one utility vector based on mean opinion scores.

10. The system of claim 3, wherein the video profiler is configured to generate at least one cost vector based on a number of bytes in the version of the video requested.

11. The system of claim 2, further comprising a user request database coupled to the user profiler, wherein the user request database is configured to store a historical user profile including a utility vector, cost vector, and a time stamp of each video requested by the user device over prior billing cycles.

12. The system of claim 2, wherein the user profiler is further configured to receive a feedback score from the user representing a quality of the selected one of the plurality of video versions and generate a personalized video utility score based on the feedback score.

13. The system of claim 12, wherein the stream selector is configured to select one of the bit-rates for the requested video based on the personalized video utility score.

14. The system of claim 1, wherein the plurality of video versions have different bit-rates and the video bit-rate can be selected by retrieving pre-encoded videos from a server or by transcoding the video in response to the video request.

15. A method for selecting one of a plurality of video versions in response to a video request by a user of a user device having a processor, the method comprising:
   configuring a computer server comprising at least one processor to connect to the user device via a network, such configuration comprising:
      configuring a video profiler to provide compressibility information related to a video;
      configuring a user profiler to predict usage patterns from a user history; and
      configuring a stream selector to pre-emptively select optimized bit-rates during a billing cycle by:
         selecting one of the plurality of video versions to deliver to the user device based on a current video utility, estimating an expected future utility of the user at different times during a billing cycle based on compressibility and usage patterns from a user history, selecting one of the plurality of video versions that maximizes the current video utility plus expected future utility of the user at selection time based on a remaining data quota,. and transmitting, via the network, the selected video for display on the user device.

16. The method of claim 15, further comprising performing a predictive analysis of user data usage by determining the likelihood of a user requesting a video during each time interval of the user's billing cycle and by determining a video type, which includes utility vector and cost vector information, and transmitting at least a portion of the predictive analysis to a stream selector located at the server.

17. The method of claim 16, further comprising generating a plurality of utility vectors and cost vectors, wherein the plurality of video versions have different bit-rates, and each bit-rate has an associated utility vector and cost vector.

18. The method of claim 17, further comprising selecting one of the bit-rates for the requested video based on the predictive analysis, the utility vector and cost vector for each of the bit-rates of the requested video, and a current time period associated with the requested video.

19. The method of claim 17, further comprising generating at least one utility vector by multiplying a peak signal-to-noise ratio by a duration of the video.

20. The method of claim 17, further comprising generating at least one utility vector based on mean opinion scores.

21. The method of claim 17, further comprising generating at least one cost vector based on a number of bytes in the version of the video requested.

22. The method of claim 17, further comprising storing the plurality of utility vectors and cost vectors for pre-encoded videos or generating the plurality of utility vectors and cost vectors by transcoding the video in response to the video request.

23. The method of claim 15, wherein the plurality of video versions have different bit-rates and the video bit-rate can be selected by retrieving pre-encoded videos from a server or by transcoding the video in response to the video request.

24. The method of claim 15, further comprising storing a historical user profile including a utility vector, cost vector, and time stamp of each video requested by the user device over prior billing cycles.

25. The method of claim 15, further comprising receiving a feedback score from the user representing a quality of the selected one of the plurality of video versions and generating a personalized video utility score based on the feedback score.

26. The method of 25, further comprising selecting one of the bit-rates for the requested video based on the personalized video utility score.

* * * * *